United States Patent [19]

Lamaudiere

[11] 4,260,340
[45] Apr. 7, 1981

[54] ELECTRIC PUMP, PARTICULARLY FOR WINDSCREEN WASHERS

[75] Inventor: Paul F. T. Lamaudiere, Paris, France

[73] Assignee: AVRI S.A., France

[21] Appl. No.: 57,111

[22] Filed: Jul. 12, 1979

[30] Foreign Application Priority Data

Jul. 20, 1978 [FR] France ................................ 78 21538
Jun. 21, 1979 [FR] France ................................ 79 15936

[51] Int. Cl.³ ...................... F04B 43/00; F04B 43/12; F04B 45/06
[52] U.S. Cl. ................................ 417/412; 15/250.01; 222/385
[58] Field of Search ............... 417/412, 422, 474, 476, 417/477, 410, 420, 423 R, 424; 222/385; 15/250.01–250.04

[56] References Cited

U.S. PATENT DOCUMENTS

| | | | |
|---|---|---|---|
| 3,130,333 | 4/1964 | Freye | 417/412 |
| 3,633,827 | 1/1972 | Novak | 15/250.02 |
| 3,942,915 | 3/1976 | Thomas | 417/412 |

FOREIGN PATENT DOCUMENTS

2037577 2/1972 Fed. Rep. of Germany .......... 417/477

*Primary Examiner*—Edward L. Roberts
*Attorney, Agent, or Firm*—Roylance, Abrams, Berdo & Farley

[57] ABSTRACT

The pumping element and the electric motor are disposed inside a sealed container formed by a tank covered with a lid. The fixing this lid on the body of the tank ensures automatically the assembling of the motor with the pumping element, as well as the fixing of the supply terminals of the motor and the connection pipes to the suction and delivery orifices of the pumping element, which are placed at the upper part of the tank.

18 Claims, 14 Drawing Figures

ELECTRIC PUMP, PARTICULARLY FOR WINDSCREEN WASHERS

BACKGROUND OF THE INVENTION

1. Field of the Invention

The present invention relates to an electric pump, particularly for windscreen washers. The pump may be either placed inside the windscreen washer reservoir serving possibly as filler plug, or mounted outside the reservoir in an entirely independent way.

2. Description of Prior Art

Pumps of this kind are known in which the driving element and the pumping element are coated with a plastic material by an over-moulding process which ensures their protection against the aggressiveness of the liquid contained in the reservoir of the windscreen washer and provides at the same time easily constructed means for closing the reservoir when the pump is used as a plug. Such a manufacturing process, to be economical, requires a well defined model of pump, and thus, cannot then be used in all cases.

SUMMARY OF THE INVENTION

The present invention has as its principal aim to remedy these disadvantages and, for this, it has as its subject matter an electric pump which is essentially characterized in that the pumping element and the electric motor are disposed inside a sealed container covered by a lid, the securing of this lid to the body of the tank ensures automatically the assembling of said motor with said pumping element as well as the connection of the supply terminals for the motor.

Thus, as will be readily understood, there can be obtained very easily and very economically motor driven pump units able to be placed without disadvantage into the liquid of the reservoir and using indifferently different types of pumping elements.

In one particular embodiment of the invention, the tank is provided in its upper part with a cylindrical skirt for fixing the container to the neck of a reservoir.

It is however evident that such a pump could also be mounted outside the reservoir.

Preferably, the pumping element is formed by a peristaltic pump disposed at the bottom of the tank, whereas the electric motor is placed thereabove with its output shaft engaged in the driving wheel of said pump.

Furthermore, the electric motor is centred on one side by the casing of the peristaltic pump and on the other by a boss on the lid of the tank which also locks it against rotation.

Moreover, the tank comprises in its upper part a peripheral crown in which are provided slots for receiving the supply terminals of the motor and notches, normally stopped up by knock-out parts, for receiving the connection pipes, all these elements being held in place in their respective housings by the seating of the lid on said elements in the closed position of the tank.

In another embodiment of the invention, the lid is fixed by clipping to the top of the tank, by means of hook shaped lugs on the tank engaging in slots in the lid. Moreover, the ends of said lugs are placed in a recess of the lid, so as to make the assembly practically thief-proof.

According to another characteristic, the supply terminals for the electric motor are mounted in slots in the lid, so as to project outwardly on one side and to bear on the other side, resiliently, directly on the output terminals of the motor.

Preferably also, the motor is in its upper part centred and wedged in the tank by means of a stepped washer locked under the lid, being keyed against rotation not only to the motor but also to the tank.

According to another characteristic of the present invention concerning the use of a peristaltic pump, the driving wheel of said pump drives a satellite compression roller which comprises a rigid metal web and which is freely seated on a deformable tube to compress the tube against the internal surface of the casing of the pump so that the compression is a function of the profile of the internal surface.

Preferably, this profile presents, at the tangential outlets, an offset portion for reducing the pressure of the compression roller on the tube by providing a larger space between the driving wheel and the casing internal surface. Thus the shocks resulting from the pressure at this level on two tubes instead of one due to the crossing of the tube can be avoided.

Moreover, to stabilize the movement of the compression roller and to reduce wear, this roller is tubular and has at its base a solid bottom providing ballasting and forming proper seating on the track which forms the lower sliding surface in the container the plastic material of which is appropriately selected to provide perfect sliding.

In a particular embodiment, the compression roller is formed by a cylindrical tube section closed at one end by means of a cap forming both ballast and bearing base.

In a variation, the compression roller may be formed from a single part by a hollow cylindrical element open at one end.

Finally, according to yet another characteristic of the present invention applicable to the case where the tank is provided in its upper part with a cylindrical skirt for fixing the container on the neck of a reservoir, resiliently deformable tongues are provided in said skirt, each of these tongues being provided on its outer surface with a ramp whose form is such as to automatically hold the container on the neck of the reservoir with compression of a seal.

BRIEF DESCRIPTION OF THE DRAWINGS

Several embodiments of the invention are described hereafter by way of examples, with reference to the accompanying drawings in which.

DESCRIPTION OF THE PREFERRED EMBODIMENTS OF THE INVENTION

Figure 1:
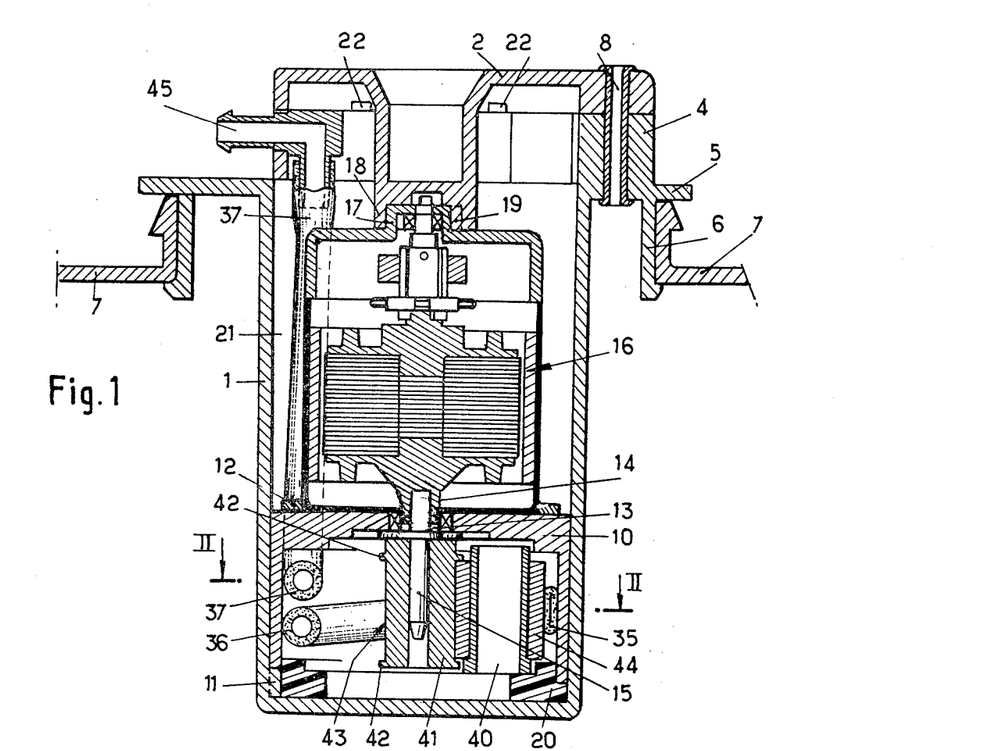
FIG. 1 is a longitudinal sectional view of an electric pump in accordance with the present invention.

Referring first of all to FIG. 1, it can be seen that all the component elements of the electric pump of the invention are housed inside a sealed container. The container made from a plastic material and which comprises essentially a tank 1 covered by a lid 2. As can be seen very clearly in FIG. 2, tank 1 has a substantially circular section, with two side bulges 3 whose function will appear clearly later on.

Figure 3:
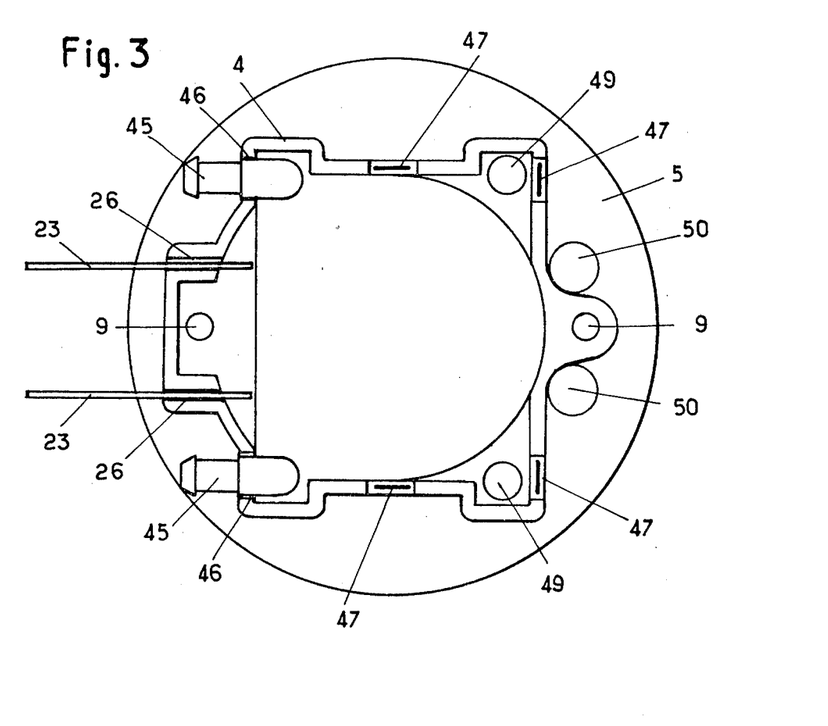
FIG. 3 is a top view of the pump with the lid removed.

Tank 1 is provided in its upper part with a crown 4, whose very special shape can be seen in FIG. 3. The crown 4 carries at its base a circular collar 5 extended downwards by a cylindrical skirt 6 allowing the pump to be mounted directly on a windscreen washer reservoir 7, in the manner of a plug. This mounting is achieved either by simple pressure of the skirt on the neck of the reservoir, as illustrated in FIG. 1 or else by a threaded connection.

Lid 2 has a shape which corresponds to that of crown 4 on which it is fixed, e.g. by means of two rivets 8 cooperating with bores 9 provided in said crown. In accordance with the invention, the very fact of placing this lid on tank 1 automatically ensures the assembly of all the elements of the pump and particularly that of the pumping element with its drive motor.

In the particular example described here, the pumping element is formed by a pump of the peristaltic type disposed inside a drum or casing 10 which is maintained centred on the bottom of tank 1. This casing 10 is furthermore keyed to the tank by means of a peg 11 provided in the bottom of the tank and which engages in a corresponding recess in the casing 10 to prevent relative rotation between the casing 10 and the tank.

Casing 10 is open at its lower part and comprises on its upper face a shoulder 12 for centring in an opening 13 provided for this purpose the bushing or bushing holder 14 of the output shaft 15 of an appropriate electric motor 16. The opposite bushing holder 17 for the motor is in its turn centred in a boss 18 in lid 2 at the base of a kind of axial chimney. It is furthermore fixed against rotation inside this boss by means of a pin 19 wedging on a corresponding flat of the bushing holder. Finally, a spacer washer 20, disposed at the bottom of tank 1 allows the height of the stack formed by the pump and its motor to be adjusted at will depending on possible sizing variations of these components.

Tank 1 leaves an annular space 21 around motor 16 where air may freely flow and thus facilitate ventilation thereof. Gaps 22 hollowed out in the seating face of lid 2 are moreover provided for ventilation.

Figure 4:
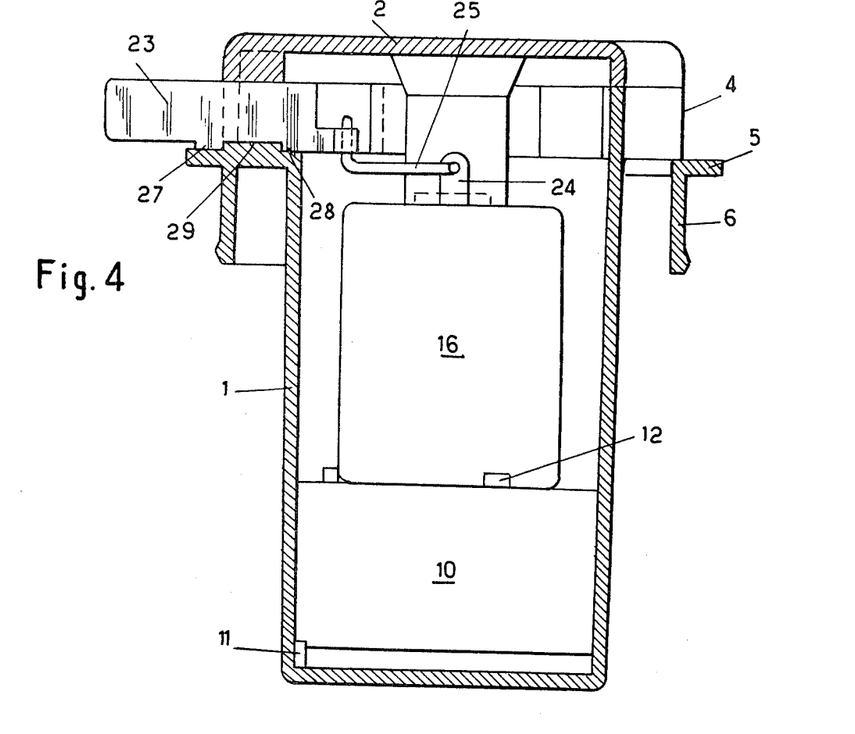
FIG. 4 is a simplified view in longitudinal section showing the fitting of the supply terminals for the drive motor of the pump.

The current supply for electric motor 16 is provided by means of two connection terminals 23 which can be best seen in FIG. 4 and which are connected to the corresponding output terminals 24 of the motor by connections 25. These connection terminals 23 project outside the container through slits 26 provided therefor in crown 4 of tank 1 and each comprises two shoulders such as 27 and 28 cooperating with a boss 29 of the slit. In accordance with the invention, terminals 23 are maintained firmly wedged inside slots 26 by the seating of lid 2.

Figure 5:
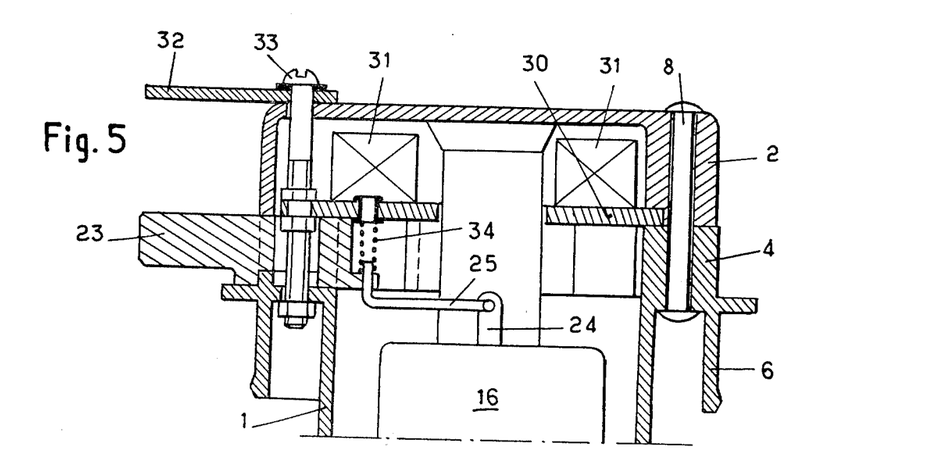
FIG. 5 is a partial sectional view of another embodiment of the invention.

In a more elaborate version, illustrated in FIG. 5, there may also be placed between crown 4 of tank 1 and lid 2, a printed circuit 30 comprising the components 31 required for supplying the electric motor 16 according to a predetermined law, e.g. a time delay, a pulsation or else joint use with another accessory. Said circuit is then fed with current by means of another terminal 32, fixed directly on lid 2 by means of a bolt 33, and is connected to terminals 24 of the motor by spring contacts such as 34 whose bearing pressure on connections 25 is provided simply by fixing lid 2 to tank 1.

As we saw above, the pump properly speaking, disposed inside drum 10, is of the peristaltic type. It comprises essentially a deformable tube 35, made from rubber or plastic material, which is pressed against the internal wall of the drum in a cycloid disposition and whose ends 36 and 37 leave said drum tangentially through openings 38 and 39 specially provided for this purpose.

On deformable tube 35 there travels a compression roller 40 which is driven by a drive wheel 41 locked in rotation with the output shaft 15 of electric motor 16.

Drive wheel 41 comprises in fact two circular collars 42 defining a guiding bearing surface 43 for roller 40 and more precisely for sleeve 44 which surrounds this roller. Said sleeve will be made from an appropriate material, so as to bear by friction, on drive wheel 41 and on tube 35.

Thus, under the effect of the compression exerted by roller 40, tube 35 is pressed or crushed locally against the internal wall or surface of casing 10. During rotation of drive wheel 41 under the action of drive motor 16, the point of deformation of tube 35 moves then along this tube while producing a suction effect behind the mobile deformation point and a discharge effect in front. The delivery flow and pressure of such a pump depend naturally on the speed communicated to roller 40 by drive wheel 41 and depends consequently essentially on the rotational speed of the electric drive motor 16. It is evident however that this pressure may be considerable when the delivery orifice of the pump is connected to an ejection nozzle reducing its section, as is precisely the case in windscreen washers.

Figure 2:
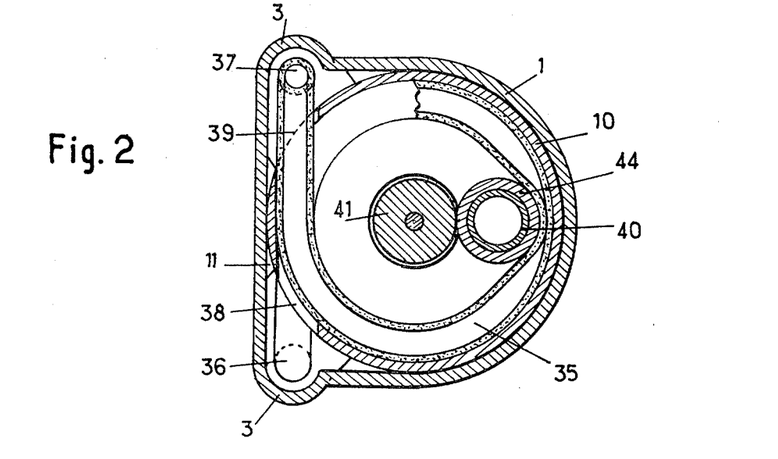
FIG. 2 is a cross-sectional view along line II—II of FIG. 1.

In the particular embodiment described here with reference to FIGS. 1 to 3, the ends 36 and 37 of deformable tube 35, after leaving drum 10 tangentially, extend upwards along tank 1 in lateral bulges 3 provided for this purpose, to be fixed to connection pipes 45 for ensuring the required junction with the suction and delivery circuits of the pump. As can be seen more clearly in FIG. 3, these connection pipes 45 project inside the container through notches such as 46 provided in the crown 4 of tank 1. Several notches 46 are in fact spaced apart along the periphery of the crown 4, these notches being normally stopped up by knock-out parts 47, so as to allow the pipes 45 to be orientated in the desired directions depending on the different possible positions of the pump on the vehicle. Moreover, and in accordance with the invention, connection pipes 45 are firmly held in place in their respective notches solely by pressure of lid 2 on tank 1.

Figure 6:
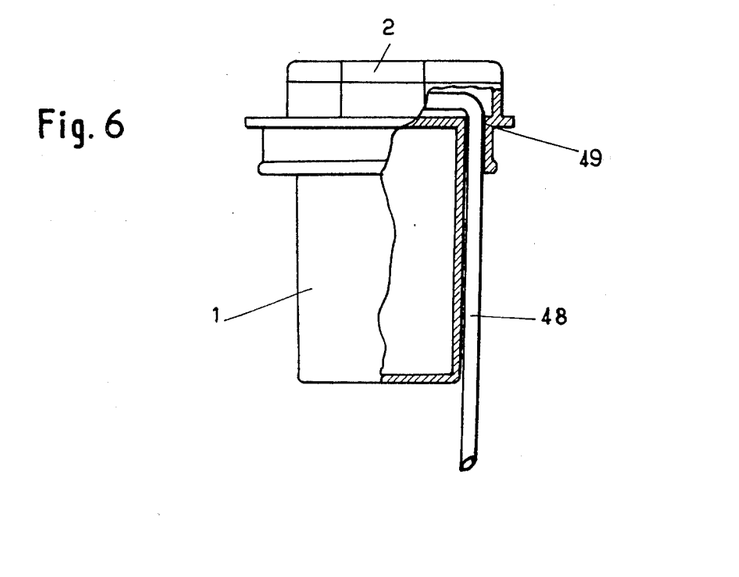
FIG. 6 is an elevational view with parts cut away illustrating particular modes of use of the pump.

It is moreover evident that when the pump of the invention is mounted directly on the reservoir of the windscreen washer serving possibly as filler plug, as illustrated in FIG. 1, a single connecting pipe is required, i.e. the one corresponding to the delivery orifice of the pump. In this case, the end of tube 35 corresponding to the suction orifice is extended, as shown at 48 in FIG. 6, so as to reach the liquid contained in the reservoir by passing through one of the knock-out holes 49 and 50 provided in collar 5 of tank 1.

Similarly, the delivery circuit of the pump could possibly, after reaching the level of collar 5, extend downwards to the lowest level point of the reservoir then extend upwards towards the corresponding connecting pipe, still passing through the knock-out holes 49 and 50 situated outside the body of tank 1. Such a path automatically siphons the outlet of the pump according to the principle of communicating vessels and ensures thereby the permanent priming thereof until the reservoir is completely emptied.

In short it can then be seen that the electric pump of the invention is very simple and inexpensive in construction, because particularly of the fact that all its component elements are automatically assembled simply by fixing lid 2 on the body of tank 1. Such is the case in particular for the pumping element and its drive motor, which are simply stacked one above the other.

Moreover, as this pump is entirely housed inside a sealed container it may be placed in a reservoir and serve therein if need be as a filler plug, without any risk or damage for its component parts. It will be noted in particular that electric motor 16 is completely independent of the liquid flow in the container. It may then, without disadvantage, occupy in the reservoir a position below the maximum liquid level in said reservoir, which was not possible with previously known devices without addition of a seal between the pump and its drive means.

Such pump could also be mounted outside the associated reservoir, the arrangement in a container then facilitating its fitting in positions in the vehicle which are not very well or poorly protected.

Figure 7:
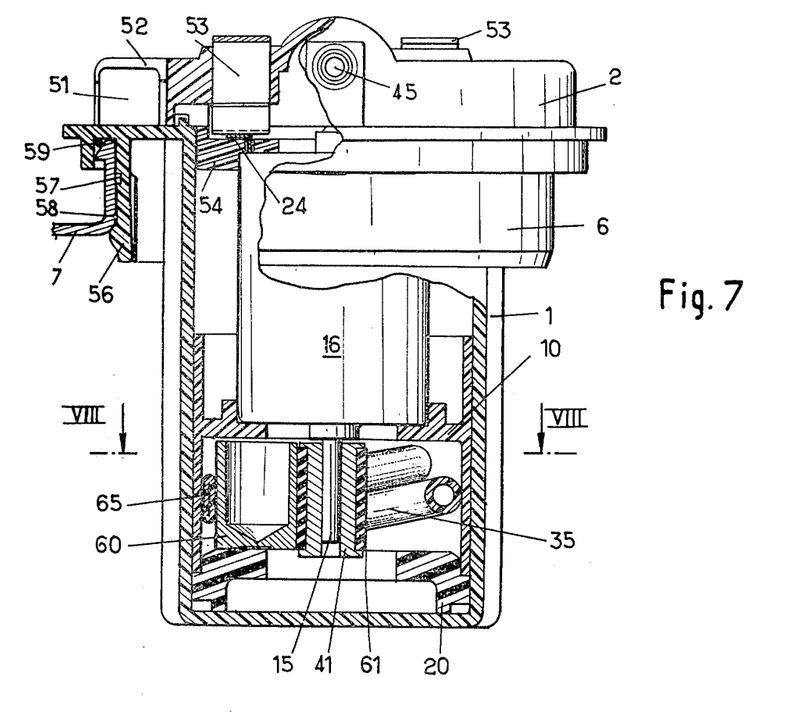
FIG. 7 is an elevational view with parts cut away of another embodiment of the invention.
Figure 8:
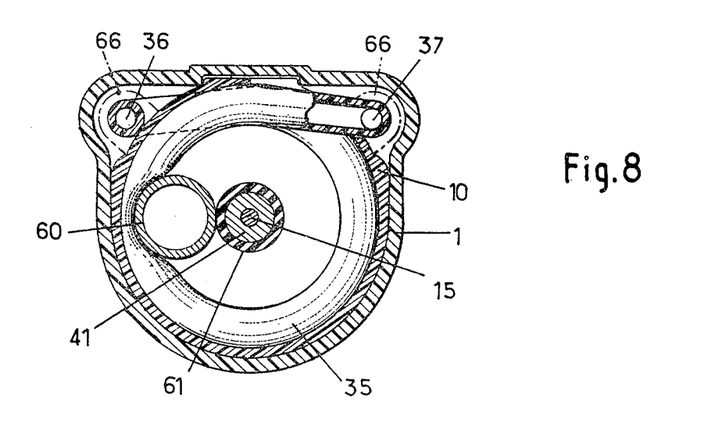
FIG. 8 is a cross-section along line VIII—VIII of FIG. 1.
Figure 9:
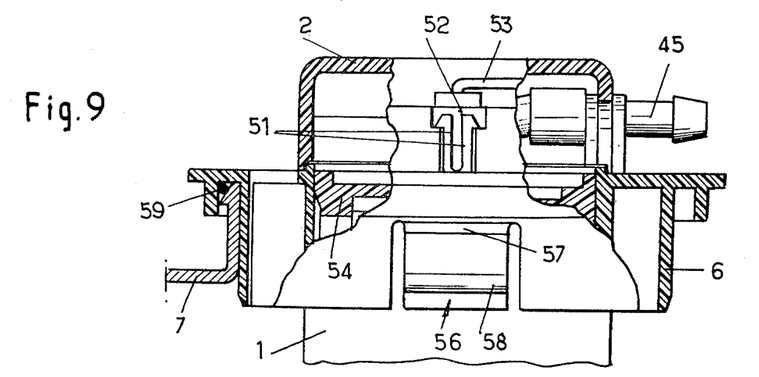
FIG. 9 is a detail view of the upper part of the pump shown in FIG. 7.
Figure 10:
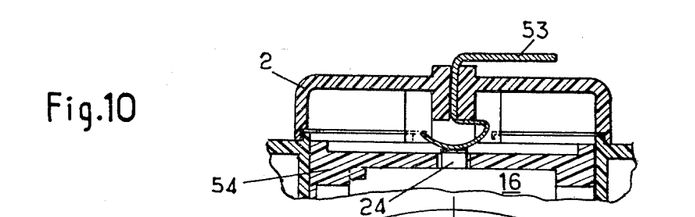
FIG. 10 is another detail view in section of the upper part of the pump shown in FIG. 7 showing the connection of the electrical connection terminals of the drive motor.
Figure 11:
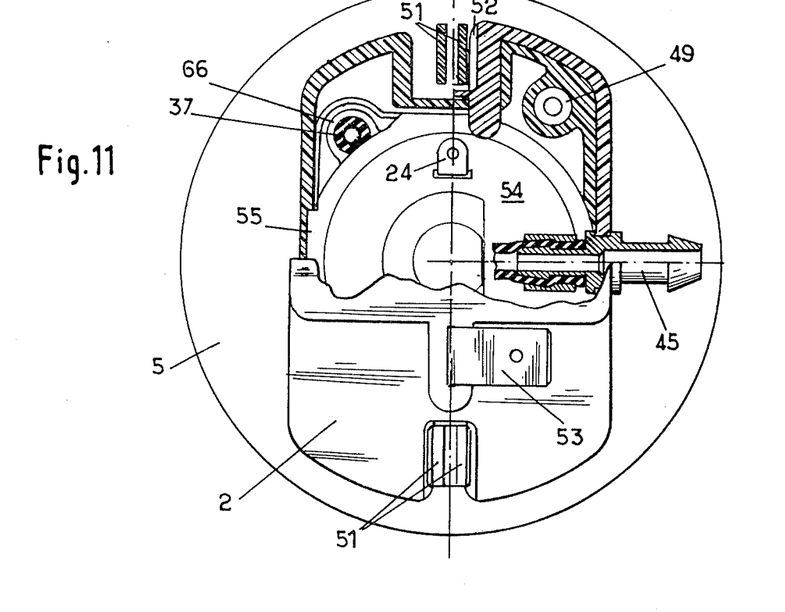
FIG. 11 is a top view of this pump with the lid partly cut away.

In the embodiment of the invention shown in FIGS. 7 to 14, lid 2 of the sealed container containing all the component elements of the pump is simply fixed by clipping to the top of tank 1. As illustrated in FIGS. 7, 9 and 11, this clipping is obtained by means of two pairs of lugs 51 in the form of hooks, moulded with the tank and which cooperate with two slots 52 provided in lid 2. As can be more clearly seen in FIG. 9, the hook-shaped ends of lugs 51 bear in fact on a shoulder provided along said slots 52 at the bottom of an indentation and are thus difficult to get at from the outside, thereby making the assembly practically thief-proof.

In the top of lid 2 there are also provided slots for passing therethrough two supply terminals 53 for electric motor 16. As can be seen very clearly in FIG. 10, these terminals 53 are simply held in place in the corresponding slot by bending the two ends. One of these ends thus projects outside for connection with an electric supply source whereas the other end is bent back inwardly in a special way so as to bear directly and resiliently on one of the output terminals 24 of motor 16. With this arrangement, the connection between connecting terminal 53 and output terminal 24 of the motor is automatically achieved when lid 2 is clipped to the top of tank 1. So as to improve the contact surface, terminals 24 pass through and are bent back against a washer 54. This washer 54 allows the electric motor 16 to be centred inside tank 1 and also secures it against rotation by means of a boss 55 engaged in a keying groove of said tank.

The cylindrical skirt 6 of tank 1 is moreover provided on its periphery or exterior surface with two tongues 56 for facilitating the clipping of the container to neck 7 of a liquid reservoir. Each of these tongues is resiliently deformable, due to a thinner portion of the wall provided during moulding. Moreover, these tongues are provided on their outer surface with a ramp 58, better seen in FIG. 7, whose special profile ensures automatically that the container is held on the neck of the reservoir, with a certain contact pressure, allowing an O-seal 59 to be compressed.

According to another characteristic of the invention, drive wheel 41 of the peristaltic pump disposed inside drum 10 is associated with a compression roller 60 which is here made from metal and which is furthermore ballasted at its lower part. In addition, the bearing surface of this satellite roller formed by the spacing washer 20 made from plastic material, is broadly dimensioned in relation to its height. Thus, when the roller is driven by the drive wheel 41 and is subjected to the effect of centrifugal force, it bears constantly with its base against the sliding surface formed by washer 20 and cannot be overturned. Of course, the metal forming roller 60 will be chosen from those allowing the best sliding conditions to be obtained with the plastic material forming washer 20, this so as to avoid premature wear prejudicial to the proper operation of the pump.

In the embodiment illustrated in FIGS. 7 and 8, satellite roller 60 is driven by means of a rubber sleeve 61 carried by drive wheel 41. In this case, the roller may be formed very simply, as a single part, by a hollow cylindrical element open at one end only.

Figure 14:
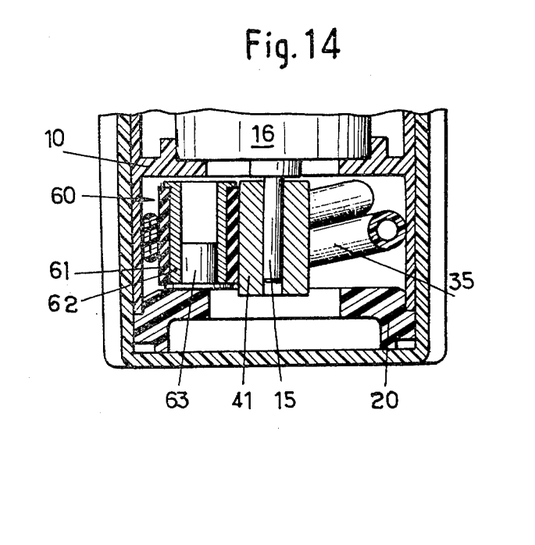
FIG. 14 is a partial sectional view illustrating another embodiment of the peristaltic pump.

But it is also possible to provide the rubber sleeve on the satellite roller, as illustrated in FIG. 14. In this case, the roller will be formed by a metal tube section 62 closed at one end by a cap 63, also made from metal, serving at one and the same time as ballast, bearing base and collar for maintaining the sleeve 61 in position.

Figure 12:
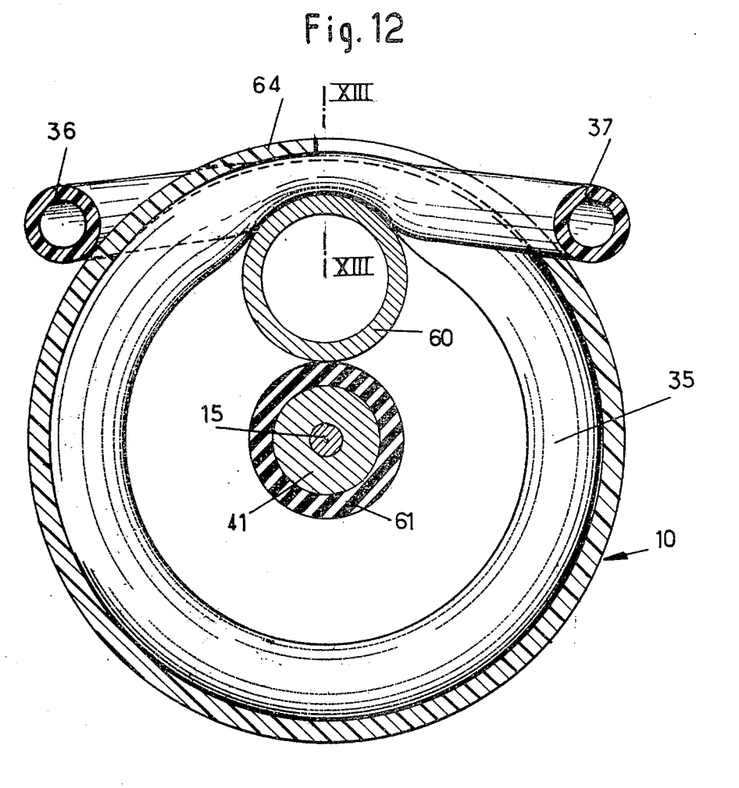
FIG. 12 is an enlarged detail view in cross-section of the peristaltic pump.
Figure 13:
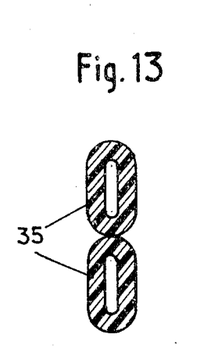
FIG. 13 is a partial sectional view along line XIII—XIII of FIG. 12.

According to yet another characteristic of the invention, the wall of drum 10 containing the peristaltic pump is thinned down on the inside surface at the level of the tangential outlets of deformable tube 35, as shown at 64 in FIG. 12. Thus, at this level, tube 35 is not completely crushed, as can be seen in FIG. 13, whereas on the contrary, over the rest of the periphery, it is completely flattened, as shown at 65 in FIG. 7. Thus, the shocks which are generally produced at the tangential outlets of the tube due to the crushing force on two tubes instead of one are avoided. Such an arrangement prolongs the life of the electric drive motor 16, whose rotational speed is thus substantially constant, which also allows a substantially constant output of the pump to be obtained.

It will be moreover noted that in this embodiment, the ends 36 and 37 of the deformable tube 35 are imprisoned in two rings 66, provided on the outer wall of drum 10 and moulded therewith, for permanently positioning the tube inside said drum and facilitating the subsequent assembling of the pump. While certain advantages embodiments have been chosen to illustrate the invention, it will be understood by those skilled in the art that various changes and modifications can be made therein without departing from the scope of the invention as defined in the appended claims.

What is claimed is:

1. An electric pump, comprising
an electric motor and supply terminals electrically coupled thereto;
a pumping element operatively coupled to said motor; and
a sealed container in which said motor and said pumping element are housed including a tank, a lid covering said tank and a substantially cylindrical skirt for fixing said container to a neck of a reservoir.

2. An electric pump according to claim 1, wherein said skirt extends from an upper part of said tank.

3. An electric pump according to claim 16, wherein resiliently deformable tongues are provided in said skirt, each said tongue having a ramp on an external surface thereof for pressing said container against the reservoir neck.

4. An electric pump comprising
an electric motor having an output shaft depending therefrom;
a pumping element having a drive wheel and a casing and being located below said motor, said output shaft being engaged in said drive wheel, said casing supporting said motor on one side thereof; and
a sealed container in which said motor and said pumping element are housed including a tank and a lid covering said tank, said lid having mounting means for supporting said motor on the other side thereof and securing said motor against rotation.

5. An electric pump according to claim 4, wherein said mounting means comprises a boss depending from said lid.

6. An electric pump according to claim 4, wherein said mounting means comprises a washer locked under said lid to said tank to prevent rotation between said tank and said washer.

7. An electric pump according to claim 4, wherein said lid is fixed to said tank by hook-shaped lugs on said tank which engage slots in said lid.

8. An electric pump according to claim 4, wherein an upper portion of said tank comprises a peripheral crown having slots therein, and wherein supply terminals electrically coupled to said motor are mounted in said slots and locked in said slots by said lid.

9. An electric pump according to claim 8, wherein said crown has notches therein, which are normally closed by knock-out parts for receiving connection pipes.

10. An electric pump according to claim 4, wherein supply terminals for said motor are mounted as slots in said lid and have portions extending inside said container and resiliently bearing directly an output terminals of said motor.

11. An electric pump according to claim 4, wherein said pumping element comprises a peristaltic pump.

12. An electric pump according to claim 11, wherein said peristaltic pump has a satellite compression roller driven by said drive wheel and a deformable tube on an internal surface of said casing, and said roller comprises a rigid metal web and is freely seated on said tube to compress said tube as a function of the profile of said container.

13. An electric pump according to claim 12, wherein said roller is tubular with a solid bottom portion for bearing against a sliding surface in said container.

14. An electric pump according to claim 13, wherein said sliding surface comprises a plastic material.

15. An electric pump according to claim 13, wherein said roller comprises a cylindrical tube section closed at one end thereof by a cap, said cap forming said solid bottom portion and providing ballast.

16. An electric pump according to claim 13, wherein said roller is formed as single part from a hollow cylindrical element open at one end.

17. An electric pump according to claim 12, wherein said casing internal surface as offset portions to reduce the pressure of said roller against said tube by providing a larger space between said drive wheel and said internal surface at tangential outlets of said tube.

18. An electric pump according to claim 4, wherein electronic circuit means for modulation the function of the pump is provided in said sealed container.

* * * * *